(12) United States Patent
Butzmann et al.

(10) Patent No.: US 9,214,819 B2
(45) Date of Patent: Dec. 15, 2015

(54) DC/DC CONVERTER CIRCUIT AND BATTERY SYSTEM

(75) Inventors: Stefan Butzmann, Beilstein (DE); Holger Fink, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 916 days.

(21) Appl. No.: 13/391,793

(22) PCT Filed: Aug. 10, 2010

(86) PCT No.: PCT/EP2010/061582
§ 371 (c)(1),
(2), (4) Date: Jun. 12, 2012

(87) PCT Pub. No.: WO2011/023529
PCT Pub. Date: Mar. 3, 2011

(65) Prior Publication Data
US 2012/0242156 A1  Sep. 27, 2012

(30) Foreign Application Priority Data
Aug. 28, 2009 (DE) .......................... 10 2009 028 973

(51) Int. Cl.
*H02J 7/00* (2006.01)
*H02M 3/335* (2006.01)
*B60L 11/18* (2006.01)
*H02J 1/00* (2006.01)
*H02M 1/00* (2007.01)

(52) U.S. Cl.
CPC ........... *H02J 7/0013* (2013.01); *B60L 11/1853* (2013.01); *B60L 11/1864* (2013.01); *H02J 7/0065* (2013.01); *H02M 3/33561* (2013.01); *H02M 2001/0077* (2013.01); *Y02T 10/7005* (2013.01); *Y02T 10/7061* (2013.01); *Y10T 307/707* (2015.04)

(58) Field of Classification Search
USPC ........................................................... 307/82
See application file for complete search history.

(56) References Cited

U.S. PATENT DOCUMENTS

| 5,623,398 | A  | * | 4/1997  | Beach et al. ................. 363/65  |
| 6,154,383 | A  |   | 11/2000 | Cardwell, Jr. |
| 8,872,384 | B2 | * | 10/2014 | Stratakos et al. ............ 307/104 |
| 2002/0126517 | A1 | * | 9/2002  | Matsukawa et al. ........... 363/69 |
| 2007/0247004 | A1 |   | 10/2007 | Tan et al. |

FOREIGN PATENT DOCUMENTS

| CN | 101064438 | 10/2007 |
| DE | 10 2005 036 806 | 2/2007 |
| DE | 10 2007 035 329 | 1/2009 |
| EP | 0 989 717 | 3/2000 |
| EP | 1 227 571 | 7/2002 |

OTHER PUBLICATIONS

International Search Report for PCT/EP2010/061582, dated Jul. 15, 2011.

\* cited by examiner

*Primary Examiner* — Robert Deberadinis
(74) *Attorney, Agent, or Firm* — Kenyon & Kenyon LLP

(57) ABSTRACT

A DC/DC converter circuit includes at least two DC/DC converters and a low-pass filter, the DC/DC converters in each case having one input side and one output side. The DC/DC converters are connected to each other in series on their output side, and the low-pass filter is post-connected to the DC/DC converters that are connected in series to each other, so as to smooth the output voltage generated by the DC/DC converters at their output side.

6 Claims, 3 Drawing Sheets

DC/DC CONVERTER CIRCUIT AND BATTERY SYSTEM

BACKGROUND OF THE INVENTION

1. Field of the Invention

The present invention relates to a DC/DC converter circuit having a plurality of DC/DC converters and a battery system which includes a DC/DC converter circuit.

2. Description of Related Art

In future, both in stationary applications, for example, in wind power plants, and also in vehicles, for instance, in hybrid vehicles and in electric vehicles, increasingly new battery systems will be used which have to satisfy high requirements with respect to reliability. These high requirements are founded on the fact that a failure of the battery system is able to lead to a failure of the overall system (for example, in an electric vehicle, the failure of a traction battery leads to a disabled vehicle or even to a safety-relevant problem (in wind power systems, for instance, battery systems are used in order to protect the system from inadmissible operating states by rotor blade adjustment during strong winds).

It is known that one may convert the voltage provided by a battery to another voltage, using a DC/DC converter (also designated as a DC motor controller). The conversion of a constant input voltage, supplied by the battery, to a different output voltage usually takes place by periodic switching of the DC/DC converter. Boost converters, forward converters, half-bridge converters and full-bridge converters, for example, are known as common DC/DC converters.

FIG. 1 shows a known half-bridge converter 31. Known half-bridge converter 31 includes a primary circuit 42 and a secondary circuit 43.

Primary circuit 42 has a transformer coil 34*a* on the primary side, secondary circuit 43 has a transformer coil 34*b* on the secondary side, the primary side transformer coil 34*a* and the secondary side transformer coil 34*b* being connected to each other to form a transformer.

Primary circuit 42 includes an H-bridge circuit having a first branch running from a first node 36 to a second node 37, and a second branch and a bridge branch lying between the first branch and the second branch. Primary side transformer coil 34*a* is situated in the bridge branch. In the first branch there is a first switch 35*a* and a first capacitor 38*a* and in the second branch there is a second switch 35*b* and a second capacitor 38*b*. In parallel to first capacitor 38*a* there is a first resistor 44*a*, and in parallel to second capacitor 38*b*, a resistor 44*b* is connected. The first branch is connected to a ground 39. Furthermore, first primary circuit 42 has a first input 50*a* and a second input 50*b*, at which a battery 49 is connected.

Secondary circuit 43 includes a rectifier circuit 40 and a low-pass filter 41. Rectifier circuit 40 includes three diodes 45*a*, 45*b*, 45*c*, by the use of which the voltage generated by secondary side transformer coil 34*b* is rectified. The tapping of the voltage at secondary side transformer coil 34*b* takes place, in this instance using a midpoint tap. Low-pass filter 41 has a coil 46 and a capacitor 47. The voltage generated in secondary circuit 43 is able to be tapped at a first output 48*a* and at a second output 48*b*.

The functional principle of half-bridge converter 1 shown in FIG. 1 is as follows: Battery 49 provides a voltage which charges capacitors 38*a*, 38*b* to one-half the battery voltage, via balanced resistors 44*a*, 44*b*. Switches 35*a* and 35*b* are now alternatingly opened and closed, so that, via primary side transformer coil 34*a*, an alternating voltage having an amplitude comes about that corresponds to one-half of the battery voltage. This alternating voltage is coupled into secondary circuit 43 using secondary side transformer coil 34*b*, and rectified via rectifier circuit 40. The rectified, pulse-shaped output voltage thus created corresponding to the pulse duty factor of switches 35*a*, 35*b* is smoothed via low-pass filter 41.

BRIEF SUMMARY OF THE INVENTION

The subject matter of the present invention is a DC/DC converter circuit which includes at least two DC/DC converters and a low-pass filter, the DC/DC converter in each case having one input side and one output side, and the DC/DC converters are connected to each other in series on their output side, and the low-pass filter is post-connected to the DC/DC converters that are connected in series to each other, to smooth the output voltage generated by the DC/DC converters at their output side.

The DC/DC converters make it possible to connect a plurality of energy sources, especially battery modules, on the input side, in parallel and/or in series. The terminal voltage of the battery modules connected in such a way, for example, is made lower by such a connection than a circuit of battery modules connected directly in series without DC/DC converters. In this way it may be achieved that no voltage is present on the input side of a DC/DC converter, which would require special handling of the battery module, for instance, during an exchange of the battery module or individual battery cells of the battery module. By a suitable circuitry of the DC/DC converters, particularly in series or in parallel, a desired output voltage or a desired current may be provided at the output side of the DC/DC converters. The device also makes possible the selection of a total voltage, that is suitable depending on the operating situation, since the output voltage of the individual DC/DC converters is able to be set according to a known fashion. In addition, the output voltage is independent of the battery modules connected at the input side. Because of that, the layout of the system formed of battery modules and a converter circuit may be made purely according to energy criteria and performance criteria, independently of the total voltage required for the respective application. A further advantage is that costly power switches for switching off such a system may be omitted, because the switching off of the voltage on the output side of the DC/DC converters is able to take place by switching off the DC/DC converters.

The post-connected low-pass filter makes it possible to smooth the total voltage coming about from the output voltages of the individual DC/DC converters, that is, eliminating higher frequency components in the total voltage. Because of the post-connection of the low-pass filter, it is possible, in particular, to do without low-pass filters in the individual DC/DC converters, which only smooth the output voltage of the respective DC/DC converter. The latter is preferred according to the present invention. Because of a polyphase control of the individual DC/DC converters, it is possible in addition to adjust the phases of the output voltages of the individual DC/DC converters in such a way that, in the summation of the individual output voltages of the DC/DC converters, voltage peaks of the individual output voltages at least partially average out. This makes it possible to use smaller and more cost-effective components for the low-pass filter.

By a "battery module" one should understand, within the scope of this invention, an individual battery cell or a circuit of a plurality of battery cells. The plurality of battery cells may be connected particularly in series and/or in parallel. A battery cell may be made, in particular, as a rechargeable accumulator cell.

One preferred specific embodiment of the present invention provides that at least one DC/DC converter of the at least two DC/DC converters includes a primary circuit and a secondary circuit, the primary circuit having a primary-side transformer coil, and the secondary circuit having a secondary-side transformer coil, and the primary-side transformer coil and the secondary-side transformer coil are connected to each other to form a transformer. This makes it possible to decouple the secondary circuit and the primary circuit galvanically.

One additional preferred specific embodiment of the present invention provides that the primary circuit include an H-bridge circuit having a first branch going from a first node to a second node, a second branch going from a first node to a second node, and a bridge branch lying between the first branch and the second branch, the primary-side transformer coil being situated in the bridge branch, in the first branch a first switch and a first terminal for the connection of a first battery module being situated, and in the second branch, a second switch and a second terminal for the connection of a second battery module being situated.

This preferred specific embodiment is based on the finding that the battery modules, connected to the first terminal and the second terminal, are able to assume the functions of capacitors and resistors, as they are used according to the related art described in the primary circuit of such a converter. The DC/DC converter developed in that way thus makes it possible to do without capacitors and resistors in the primary circuit. With that, the design of such a converter is able to be simplified considerably.

A further subject matter of the present invention, which includes at least a DC/DC converter circuit and at least two battery modules, the DC/DC converters each having one input side and in each case at least one battery module being connected to a DC/DC converter on an input side of a DC/DC converter.

DETAILED DESCRIPTION OF THE INVENTION

Figure 1:
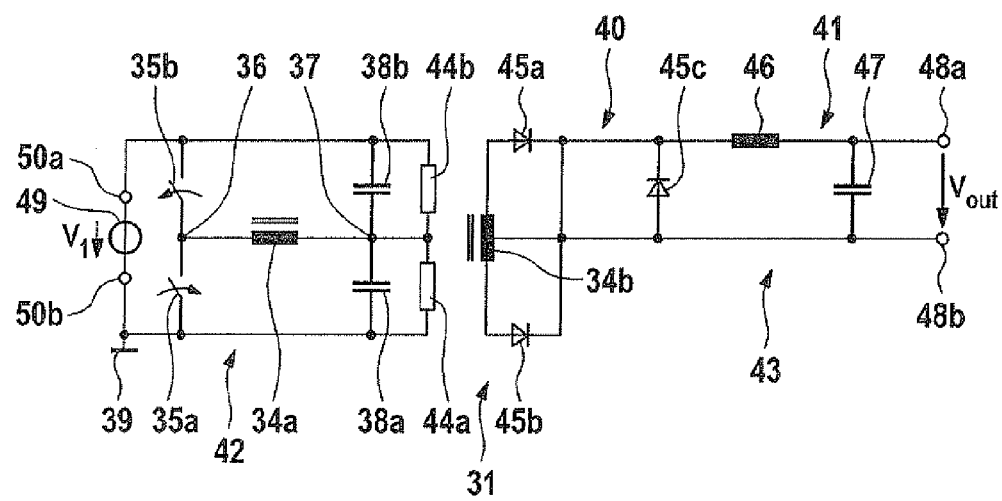
FIG. 1 shows an overview diagram of a DC/DC converter, according to the related art.

Identical components or equivalent components in the figures have been provided with the same reference numerals.

Figure 2:
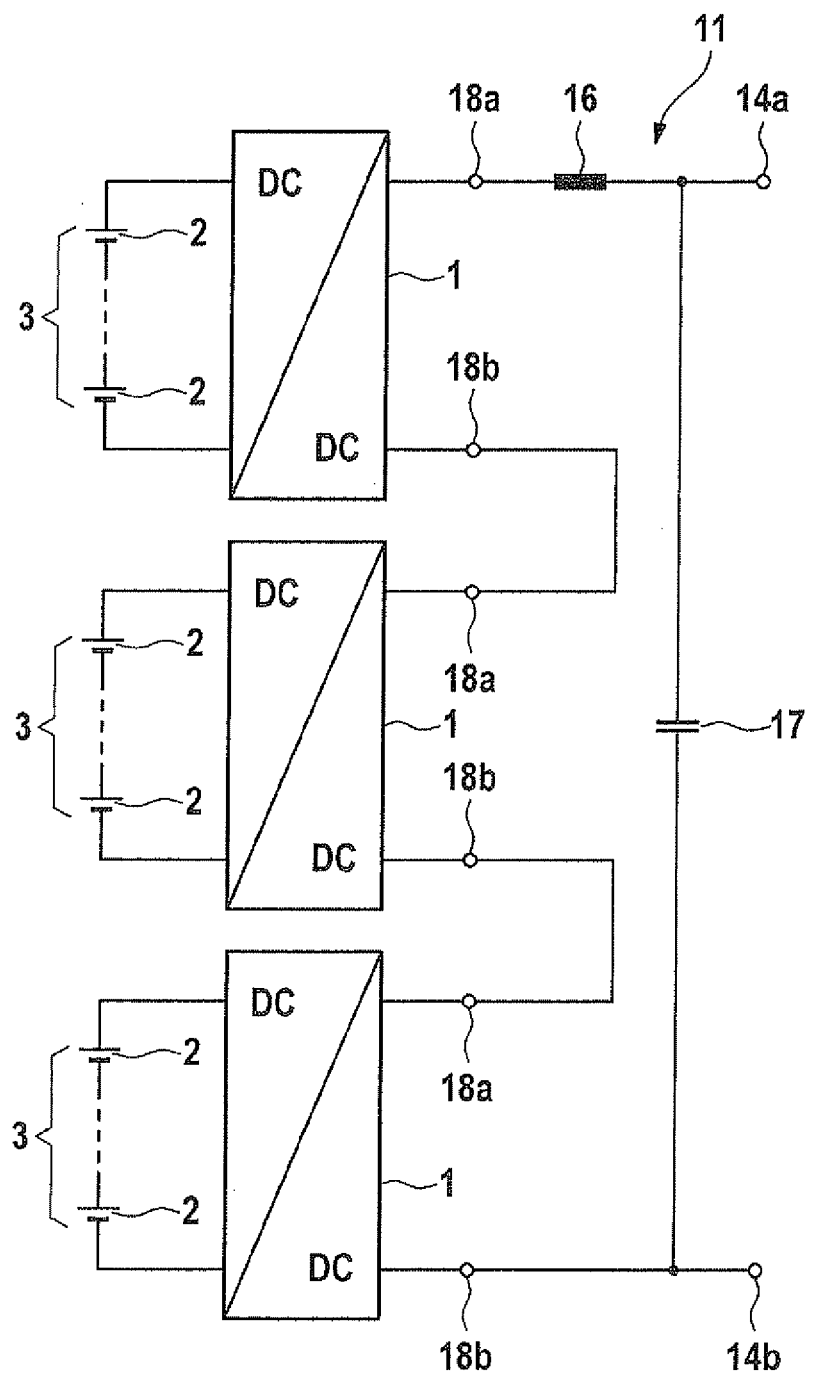
FIG. 2 shows an overview diagram of a first specific embodiment of a battery system according to the present invention, having a DC/DC converter circuit according to the present invention.

In an overview diagram, FIG. 2 shows a first specific embodiment of a battery system according to the present invention. The battery system includes a DC/DC converter circuit and three battery modules 3.

The DC/DC converter circuit includes three DC/DC converters 1. Each DC/DC converter 1 has an input side, at which an input voltage is able to be applied, and an output side, at which an output voltage is able to be tapped that has been converted by DC/DC converter 1. In this exemplary embodiment, on the input side of each DC/DC converter 1, a battery module 3 is connected which provides a constant input voltage to the respective DC/DC converter 1.

A battery module 3 includes a plurality of battery cells 2, which are connected in series. In this exemplary embodiment, battery cells 2 are accumulator cells, Li-ion cells, for example. Alternatively, battery module 3 may include only one single battery cell 2. Furthermore, it is also possible to connect battery cells 2 at least partially in parallel.

At their output side, DC/DC converters 1 are connected in series with each other via first outputs 18a and second outputs 18b. At first output 18a of the one outer DC/DC converter 1 and at the second output 18b of the other outer DC/DC converter 1, a total voltage is present which is yielded by the sum of the output voltages of the individual DC/DC converters 1.

Moreover, the DC/DC converter circuit includes a low-pass filter 11. Low-pass filter 11 is post-connected to the DC/DC converters 1 that are connected in series to one another, and it smoothes the total voltage yielded by the output voltages of the individual DC/DC converters.

Low-pass filter 11 is designed as an LC low-pass filter. Low-pass filter 11 includes an inductor L 16 in the form of a coil and a capacitance C 17 in the form of a capacitor.

after the filtering of the total voltage by low-pass filter 11, the total voltage smoothed by the filtering is able to be tapped at a first pick-off 14a and a second pick-off 14b of the battery system.

The three DC/DC converters 1 may be designed, for example, as half-bridge converters, forward-converters, push-pull converters and/or full-bridge converters.

Figure 3:
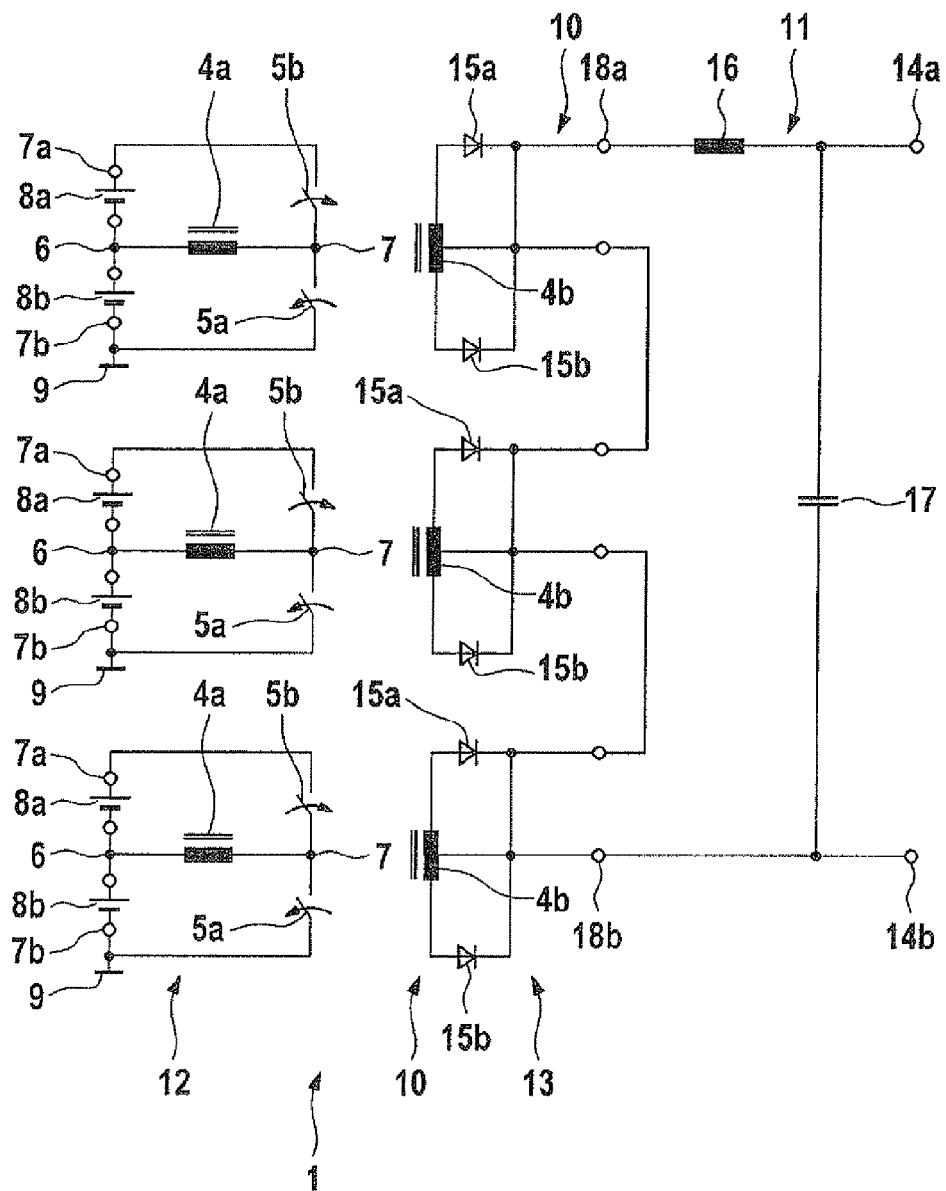
FIG. 3 shows an overview diagram of a second specific embodiment of a battery system according to the present invention, having a DC/DC converter circuit according to the present invention.

In an overview diagram, FIG. 3 shows a second specific embodiment of a battery system according to the present invention.

The battery system according to the second specific embodiment is a variant of the battery system according to the first specific embodiment. In this specific embodiment, DC/DC converters 1 of the second battery system are developed as special half-bridge converters.

Half-bridge converter 1 includes a primary circuit 12 and a secondary circuit 13. Primary circuit 12 has a transformer coil 4a on the primary side, secondary circuit 13 has a transformer coil 4b on the secondary side, the primary side transformer coil 4a and the secondary side transformer coil 4b being connected to each other to form a transformer.

Furthermore, primary circuit 12 includes an H-bridge circuit having a first branch running from a first node 6 to a second node 7, and a second branch running from the first node 6 to the second node 7 and a bridge branch lying between the first branch and the second branch. Primary side transformer coil 4a is situated in the bridge branch. In the first branch there is situated a first switch 5a and a first terminal 7a for connecting a first battery module 8a, and in the second branch there is situated a second switch 5b and a second terminal 7b for connecting a second battery module 8b. In addition, the first branch is connected to a ground 9 between first terminal 7a and first switch 5a.

Secondary circuit 13 also includes a rectifier circuit 10 for rectifying the voltage converted by the transformer. Rectifying circuit 10 includes two diodes 15a and 15b. Diodes 15a and 15b are positioned in the secondary circuit in the manner of a branch way rectifier. The tapping of the voltage at secondary side transformer coil 4b takes place via a midpoint tap.

First battery module 8a and second battery module 8b are connected to first terminal 7a or second terminal 7b, of primary circuit 12, in such a way that unequal poles of first battery module 8a and second battery module 8b lie opposite to each other in the circuit.

First battery module 8a and second battery modules 8b may be executed as a single battery cell. Alternatively, a battery module 8a, 8b may include a plurality of battery cells, the battery cells being at least partially connected in series and/or in parallel. A battery module 8a, 8b may also be formed by a battery. Battery modules 8a, 8b preferably include battery cells that are designed as an accumulator. A battery cell is preferably executed as a lithium ion cell.

The functioning principle of half-bridge converter 1 is described as follows: When first switch 5a is closed, the voltage of first battery module 8a is present via primary-side transformer coil 4a. This voltage is transmitted via secondary-side transformer coil 4b into secondary circuit 13. When first switch 5a is opened again, the energy stored in transformer coil 4a on the primary side is removed in the form of a current, which flows into second battery module 8b. When second switch 5b is closed, the process repeats in the opposite direction. By the selection of the pulse control factors of first switch 5a and second switch 5b, not only is the voltage at outputs 18a, 18b of half-bridge converter 1 able to be adjusted in this manner, but charge balancing between battery modules 8a, 8b may also be carried out.

Moreover, the DC/DC converter circuit includes a low-pass filter 11. Low-pass filter 11 is post-connected to the DC/DC converters 1 that are connected in series to one another, and it smoothes the total voltage yielded by the output voltages of the individual DC/DC converters.

According to the first specific embodiment, after the filtering of the total voltage by low-pass filter 11, the total voltage smoothed by the filtering is able to be tapped at first pick-off 14a and a second pick-off 14b of the battery system.

In the specific embodiments of the battery systems described, because of a polyphase control of the individual DC/DC converters 1, it is possible to adjust the phases of the output voltages of individual DC/DC converters 1 in such a way that, in the summation of the individual output voltages of the DC/DC converters, voltage peaks of the individual output voltages at least partially average out. This makes it possible, for example, to use small and cost-effective components for inductor 16 and capacitor 17 for low-pass filter 11. In order to implement such a control, the battery system has, for example, a control device, not shown in greater detail, for the control of DC/DC converters 1, using which, the switches of DC/DC converters 1 are controlled in a polyphase manner, according to a suitable algorithm.

Such battery systems are suitable, for instance, as a part of the energy supply of a motor vehicle, especially as a part of a vehicle electrical system of a motor vehicle.

What is claimed is:

1. A DC/DC converter circuit, comprising:
    at least two DC/DC converters; and
    a low-pass filter;
    wherein the DC/DC converters in each case have one input side and one output side, and the DC/DC converters are connected to each other in series on the output sides, and
    wherein the low-pass filter is post-connected to the DC/DC converters which are connected in series to one another, and wherein the low-pass filter smoothes the output voltage generated by the DC/DC converters at the output sides of the DC/DC converters;
    wherein at least one of the DC/DC converters includes a primary circuit and a secondary circuit, the primary circuit having a primary-side transformer coil and the secondary circuit having a secondary-side transformer coil, and the primary-side transformer coil and the secondary-side transformer coil are connected to each other to form a transformer; and
    wherein:
        the primary circuit includes an H-bridge circuit having a first branch going from a first node to a second node, the first branch including a first battery module, a second branch going from a first node to a second node, the second branch including a second battery module, and a bridge branch lying between the first branch and the second branch, the first node being positioned between the first and second battery modules;
        the primary-side transformer coil is situated in the bridge branch;
        in the first branch, a first switch and a first terminal for the connection of the first battery module are situated; and
        in the second branch, a second switch and a second terminal for the connection of the second battery module are situated.

2. The DC/DC converter circuit as recited in claim 1, wherein the low-pass filter includes an inductor and a capacitor.

3. The DC/DC converter circuit as recited in claim 1, wherein at least one of the first branch and the second branch is connected to a ground.

4. The DC/DC converter circuit as recited in claim 1, wherein the secondary circuit has a rectifier circuit for rectifying the voltage transformed by the transformer.

5. The DC/DC converter circuit as recited in claim 1, wherein the at least two DC/DC converters are configured as at least one of half-bridge converters, forward converters, push-pull converters, and full-bridge converters.

6. The DC/DC converter circuit as recited in claim 1, wherein the first battery module and the second battery module are connected in such a way that unequal poles of the first battery module and the second battery modules lie opposite in the circuit.

\* \* \* \* \*